US006251457B1

(12) United States Patent
Takaichi et al.

(10) Patent No.: US 6,251,457 B1
(45) Date of Patent: *Jun. 26, 2001

(54) STABLE PRESERVATION METHOD OF POWDERED SOFT DRINK PREPARATION AND POWDERED SOFT DRINK PREPARATION

(75) Inventors: Akihisa Takaichi, Naruto; Toshihiko Okamoto, Tokushima; Tetsuo Fukuda, Naruto, all of (JP)

(73) Assignee: Oisuka Pharmaceutical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/704,731
(22) PCT Filed: Jan. 22, 1996
(86) PCT No.: PCT/JP96/00109
  § 371 Date: Sep. 13, 1996
  § 102(e) Date: Sep. 13, 1996
(87) PCT Pub. No.: WO96/22704
  PCT Pub. Date: Aug. 1, 1996

(30) Foreign Application Priority Data

Jan. 24, 1995  (JP) .................................................. 7-028804

(51) Int. Cl.⁷ ..................................................... A21D 4/00
(52) U.S. Cl. ....................... 426/321; 426/330.3; 426/590; 426/591
(58) Field of Search ..................................... 426/534, 590, 426/591, 598, 599, 321, 330.3, 549

(56) References Cited

U.S. PATENT DOCUMENTS

| 4,278,695 | * | 7/1981 | Velasco ................. 426/289 |
| 4,619,833 | * | 10/1986 | Anderson .............. 426/548 |
| 4,740,380 | * | 4/1988 | Melachouris et al. ...... 426/590 |
| 4,919,963 | * | 4/1990 | Heckert ................. 426/599 |

FOREIGN PATENT DOCUMENTS 2 183 808   6/1987  (GB) .

OTHER PUBLICATIONS

Derwent Publications Ltd., London, GB; Class D13, AN 83–817418, XP002002267, 1983.
Derwent Publications Ltd., London, GB; Class A92, AN 90–236040, XP002002268, 1990.

* cited by examiner

Primary Examiner—Leslie Wong
(74) Attorney, Agent, or Firm—Sughrue, Mion, Zinn, Macpeak & Seas, PLLC

(57) ABSTRACT

The present invention provides a stable preservation method of a powdered soft drink preparation, which includes adding 0.2 to 1.0% by weight of a calcium oxide and 0.02 to 2.0% by weight of a particulate silicon dioxide in the powdered soft drink preparation containing a carbohydrate and a sour agent as a main component. The powdered soft drink preparation of the present invention maintains the original powder state, color and taste, which are obtained immediately after the production, for a long period of time without causing comparatively rapid coagulation of powders, discoloration and change in taste at the time of preservation.

16 Claims, No Drawings

STABLE PRESERVATION METHOD OF POWDERED SOFT DRINK PREPARATION AND POWDERED SOFT DRINK PREPARATION

This is a National Stage filing of PCT/JP96/00109, filed Jan. 22, 1996.

TECHNICAL FIELD

The present invention relates to a stable preservation method of a powdered soft drink preparation, and a powdered soft drink preparation.

BACKGROUND ART

A powdered soft drink preparation normally contain a carbohydrate and a sour agent as a main component, and is prepared by additionally adding a subraw material such as fruit juice. It is necessary that the powdered soft drink preparation maintains the dried state as much as possible because of its high moisture absorption. That is, the soft drink preparation causes deterioration such as coagulation, browning, discoloration in the presence of water, which results in deterioration of the quality.

In addition, this preparation always contain about 1% of water derived from the raw material even if water is severely controlled. When the component causing the reaction between water and the above main component is present in the subraw material, for example, when a basic nutritive component is present, the neutralization reaction proceeds with time. When amino acid is added, the browning due to Mailard reaction arises. Therefore, there is a drawback in both cases that it becomes very difficult to maintain the preparation stably.

Furthermore, even if the preparation is reserved in an enclosed container, it is difficult to avoid deterioration of quality and change of taste with time, which are caused by the above-described water of about 1%, water adhered on raw materials, water to be formed by the neutralization reaction between the added components. Therefore, it is essential for the preparation to use a desiccant at present. Thus, it is requested to develop a novel method for preventing deterioration due to water for a long period of time to maintain the quality.

DISCLOSURE OF THE INVENTION

A main object of the present invention is to solve a drawback such as deterioration caused in the presence of water, which is admitted in a conventional powdered soft drink preparation, thereby providing a powdered soft drink having an excellent preservation stability for a long period of time.

The present inventors have intensively studied so as to accomplish the above object. As a result, it has been found that a powdered soft drink preparation having an excellent preservation stability can be obtained when a predetermined amount of a calcium oxide and a particulate silicon dioxide are added in a conventional powdered soft drink preparation.

That is, according to the present invention, there is provided a stable preservation method of a powdered soft drink preparation, which comprises adding 0.2 to 1.0% by weight of a calcium oxide and 0.02 to 2.0% by weight of a particulate silicon dioxide in the powdered soft drink preparation containing a carbohydrate and a sour agent as a main component. There is also provided a powdered soft drink preparation thus obtained and having an improved reservation stability.

According to the method of the present invention, it is considered that the calcium oxide to be added reacts chemically with water derived from the raw material in the preparation to remove water. Thereby, a water content in the preparation is reduced to stabilize the preparation. As a result, the preparation exhibits a high preservation stabilization effect for a sufficiently long period of time without using no desiccant. On the other hand, it is considered that the particulate silicon dioxide serves as a so-called coating agent which coats the surfaces of the raw material powders to reduce the opportunity of direct contacting between powders having a high reactivity, thereby improving physical properties and stability of the preparation.

According to the method of the present invention, there can be obtained a powdered soft drink preparation having a high preservation stability which has never been accomplished, heretofore. That is, regarding the preparation of the present invention, the commercial value such as flavor is not deteriorated, and drawbacks such as coagulation and browning are prevented. Furthermore, the above-mentioned components to be added have safety guaranteed in the field of the food industry. At the same time, they are tasteless and odorless and, therefore, there is not any fear of exerting a harmful influence on the taste of the soft drink preparation itself.

BEST MODE FOR CARRYING OUT THE INVENTION

The calcium oxide to be added in the powdered soft drink preparation is contained in an amount of not less than 0.2% by weight, thereby exhibiting the desired stabilization effect of the preparation. Even if the large amount of the calcium oxide is added, the stabilization effect is not improved in proportion to the amount, and the taste, flavor, solubility, etc. of the preparation are likely to be deteriorated. Therefore, it is preferred to use the calcium oxide in an amount of not more than 1.0% by weight. Particularly preferred amount is selected within a range of 0.2 to 0.5% by weight.

Regarding the silicon dioxide, the desired effect can be exhibited by adding in an amount within a range of 0.02 to 2.0% by weight, and it is preferred to use it in an amount within a range of 0.03 to 1.0% by weight.

The calcium oxide is not specifically limited, but those synthesized chemically and those obtained by calcining shells or egg shells derived from natural products can be advantageously used in the present invention. Among them, the chemically synthesized calcium oxide and shell-calcined calcium derived from natural products are particularly preferred from the viewpoint of organoleptic properties such as taste of the resulting preparation.

The particulate silicon dioxide is not also specifically limited and various ones which are known to public can be used. Among them, those having a three-dimensional amorphous structure like silica gel is normally preferred. Further, as the particulate silicon dioxide, those having an average particle size of not more than 15 $\mu$m, which are defined as a food additive at present, are used.

The powdered soft drink preparation to be stabilized by adding the above two specific components according to the present invention may be the same composition as that of a most popular one containing, as a main component, a carbohydrate and an organic acid as a sour agent. The amount of the main component to be added can be decided within a normal range according to the shape, use and purpose of using of the preparation. It is preferred that the amount of the carbohydrate in order to obtain good organoleptic properties is selected within a range of about 65 to 95% by weight in the powdered preparation. After the carbohydrate was dissolved in water, the amount is selected within a range of about 4 to 12% by weight.

Examples of the above carbohydrate are one or more of normal carbohydrates, which can be selected from monosaccharides such as glucose and fructose; disaccharides such as sucrose and maltose; polysaccharides such as oligosaccharide. The effect of the present invention is enhanced, when using monosaccharides (e.g. fructose) which have high moisture absorption and high reactivity.

The sour agent to be used as another main component may be various organic acids which are normally used. Typical examples include citric acid, tartaric acid, fumaric acid, malic acid, lactic acid and ascorbic acid. They may be used alone or in combination.

Optional components such as various vitamins, amino acids and minerals can be appropriately added in the powdered soft drink preparation of the present invention according to the purpose of using. In addition to them, there can be appropriately added binders, excipients, disintegrators, lubricants, thickeners, surfactants, osmotic pressure adjustors, electrolytes, sweeteners, flavors, pigments, pH adjustors and the like.

The powdered soft drink preparation of the present invention can be prepared according to the same manner as in the normal powdered soft drink preparation except for adding a predetermined amount of the above two components. The time of the addition of the above essential two components is not specifically limited and it may be any time in the desired preparation step of the preparation.

Thus, the desired powdered soft drink preparation whose preservation stability has been improved can be obtained.

FIELD OF INDUSTRIAL APPLICABILITY

According to the method of the present invention, a preservation stability of a powdered soft drink preparation is remarkably improved. As a result, regarding the preparation of the present invention, the commercial value such as flavor is not deteriorated, and drawbacks such as the coagulation and browning are prevented. Components to be added as preservative stabilizers have safety guaranteed in the field of the food industry. At the same time, they are tasteless and odorless and, therefore, there is not any fear of exerting a harmful influence on the taste of the soft drink preparation itself.

EXAMPLES

In order to explain the present invention in detail, Preparation Examples of the preparation of the present invention will be described below. Then, Stability Test carried out with respect to the resulting preparation will be described. In the respective Examples, "percentages" are by weight unless otherwise stated.

Examples 1 to 9

The respective components described in Table 1 were weighed and mixed to prepare powdered soft drink preparations. These are dissolved in 1 liter of water to be served as a drink.

TABLE 1

| Component (%) | Examples No. | | | | | | | | |
| --- | --- | --- | --- | --- | --- | --- | --- | --- | --- |
| | 1 | 2 | 3 | 4 | 5 | 6 | 7 | 8 | 9 |
| Glucose | — | — | — | 80 | 80 | 80 | — | — | — |
| Fructose | 80 | 80 | 80 | — | — | — | — | — | — |
| Granulated sugar | — | — | — | — | — | — | 80 | 80 | 80 |
| Sour agent | s.a. | s.a. | s.a. | s.a. | s.a. | s.a. | s.a. | s.a. | s.a. |
| L-ascorbic acid | 3.0 | 3.0 | 3.0 | 3.0 | 3.0 | 3.0 | 3.0 | 3.0 | 3.0 |
| L-arginine | 3.3 | 3.3 | 3.3 | 3.3 | 3.3 | 3.3 | 3.3 | 3.3 | 3.3 |
| Shell-calcined calcium | 0.25 | 0.5 | 1.0 | 0.25 | 0.5 | 1.0 | 0.25 | 0.5 | 1.0 |
| Particulate silicon dioxide | 0.05 | 0.1 | 0.5 | 0.05 | 0.1 | 0.5 | 0.05 | 0.1 | 0.5 |
| Powdered juice | 2.0 | 1.5 | 1.0 | 2.0 | 1.5 | 1.0 | 2.0 | 1.5 | 1.0 |
| Various vitamins | s.a. | s.a. | s.a. | s.a. | s.a. | s.a. | s.a. | s.a. | s.a. |
| Flavor | s.s. | s.a. | s.a. | s.a. | s.a. | s.a. | s.a. | s.a. | s.a. |
| Total weight (g) | 62.5 | 62.5 | 62.5 | 62.5 | 62.5 | 62.5 | 62.5 | 62.5 | 62.5 | s.a.: suitable amount

Preservation Stability Test 1

The preparation of the present invention obtained according to the following Preparation Example I and the following control preparations were subjected to a comparison test.

| Preparation Example A (formulation) | |
| --- | --- |
| Fructose | 83% |
| Sour agent | suitable amount |
| L-arginine | 3.3% |
| L-ascorbic acid | 2.5% |
| Powdered fruit juice | 2.0% |
| Sodium chloride | suitable amount |
| Shell-calcined calcium | 0.25% |
| Particulate silicon dioxide | 0.05% |
| Flavor and pigment | suitable amount |
| Total | 100% (total amount: 62.5 g) |

(1) Control preparation (containing no shell-calcined calcium): preparation obtained according to the same manner as that described in Preparation Example A except for adding no shell-calcined calcium
(2) Control product 1: preparation obtained according to the same manner as that described in Preparation Example A except for adding no shell-calcined calcium and particulate silicon dioxide (3) Control product 2: preparation obtained according to the same manner as that described in Preparation Example A except for adding no particulate silicon dioxide.

The above respective preparations were prepared by mixing with hands and packed separately in a bag made of an aluminum laminated film, respectively. The bag was preserved in a constant temperature room and the preservation stability thereof was tested.

The followings were selected as the test item.
1. Coagulation of preparation
2. Degree of discoloration of preparation
3. Change in organoleptic property (taste) in dissolution of preparation The results were as follows.

1. Coagulation of Preparation

The preparation of Preparation Example A (product of the present invention) and control preparation (containing no shell-calcined calcium, controls 1 and 2) were allowed to stand in a constant temperature room at 50° C. to visually observe the state of the respective samples after 2, 3 and 4 weeks, respectively.

As a result, the product of the present invention caused no coagulation even after standing at 50° C. for 4 weeks and was superior in powder fluidity. To the contrary, in all control preparations, the coagulation state became serious by adding no shell-calcined calcium and/or particulate silicon dioxide. After standing for 3 weeks, the preparations were coagulated tightly and showed a sheet-like state (regarding the control product 2, the mass was sometimes broken because the degree of the coagulation is slightly low) and it could not be easily returned to the powder state. Furthermore, the solubility of the respective control preparations in water became inferior, in comparison with the preparation of the present invention after standing under the same condition.

2. Degree of Discoloration of Preparation

The respective preparation samples whose coagulation state was judged according to the above item 1 were visually observed and the change in color with time of the respective samples was examined using a color difference meter. Further, the value after a predetermined time has been passed was judged by NBS unit (ΔE: color difference) and Lab, using the value before the beginning of the test as a standard. The explanation of the value of the NBS unit and indication of visual sense ("Matter with respect to Color", published by Nihon Denshoku Kogyo) as well as evaluation of Lab are as follows.

| (NBS unit) | (Visual sense) |
| --- | --- |
| 0 to 0.5 | faintly |
| 0.5 to 1.5 | slightly |
| 1.5 to 3.0 | in the degree capable of perceiving |
| 3.0 to 6.0 | in the degree of being remarkable |
| 6.0 to 12.0 | greatly |
| 12.0 or more | drastically |

Lab
L: The larger the value of L, the higher the brightness is.
a: It shows a degree of red at the (+) side, and a degree of green at the (−) side.
b: It shows a degree of yellow at the (+) side, and a degree of blue at the (−) side.

The test results of the preparation of the Preparation Example A (product of the present invention) and control product 1 are shown in Tables 2 and 3.

TABLE 2

| Condition of change with time (NBS) | Preparation A (product of (the present invention) | Control product 1 |
| --- | --- | --- |
| 50° C., 2 weeks | 2.38 | 15.00 |
| 50° C., 3 weeks | 4.70 | 16.20 |
| 50° C., 4 weeks | 5.01 | 23.19 |

TABLE 3

| Condition of change with time (Lab) | Preparation A (product of (the present invention) | | | Control product 1 | | |
| --- | --- | --- | --- | --- | --- | --- |
| | L | a | b | L | a | b |
| at the time of beginning | 89.62 | 0.93 | 6.74 | 89.68 | 1.21 | 5.84 |
| 50° C., 2 weeks | 89.23 | 0.03 | 8.91 | 80.33 | 2.54 | 18.41 |
| 50° C., 3 weeks | 88.29 | 1.05 | 11.25 | 78.65 | 2.84 | 18.51 |
| 50° C., 4 weeks | 88.43 | 0.28 | 11.56 | 71.03 | 4.89 | 20.03 |

As is apparent from the above tables, the discoloration was hardly observed in the product of the present invention, in comparison with the control product 1. That is, regarding the product of the present invention, the brightness hardly changed and a stable color tone was shown even after preservation at 50° C. for 4 weeks. To the contrary, regarding the control product 1, the brightness was decreased with time during preserving at 50° C. and the degree of red and yellow was increased. This means that the fact that browning proceeds with time is showed clearly with the numerical value.

Actually, regarding the product of the present invention, little discoloration was admitted by visual observation even after preservation at 50° C. for 4 weeks. To the contrary, regarding the control product 1, a remarkable discoloration has already been admitted after 2 weeks.

Further, regarding the control preparation containing no shell-calcined calcium and the control product 2, a remarkable discoloration which is almost the same as that of the above control product 1 was admitted. Among them, the control product 2 tends to cause a weak degree of browning.

3. Change in Organoleptic Property (Taste) in Dissolution of Preparation

A standard sample which was preserved in a dark place at 4° C. after preparation, and samples which were obtained by preserving the standard samples at 37° C. or 50° C. for a predetermined time were used. The change in taste of each sample due to preservation was evaluated by asking three panelists to try each drink which was prepared by dissolving 62.5 g of each sample in 1 liter of cold water. Evaluation was carried out on the basis of the following five-level marks in comparison of the standard sample by the organoleptic test.
5 Marks: Not changed.
4 Marks: The flavor became faint, slightly, but the total unity of the taste was not changed.
3 Marks: The flavor became faint and the pleasant taste was disappeared.
2 Marks: The change in flavor and taste were clearly admitted and the nasty smell was also admitted.
1 Mark: The flavor becomes inferior, drastically, and the nasty taste and smell (e.g. bitter taste, burnt smell, etc.) were admitted.

The results of the product of the present invention and control 1 are shown in the following Table 4.

TABLE 4

| Condition of change with time (Lab) | Preparation A (product of (the present invention) | Control product 1 |
|---|---|---|
| 50° C., 2 weeks | 4 marks | 2 marks |
| 50° C., 3 weeks | 3 marks | 1 mark |
| 50° C., 4 weeks | 3 marks | 1 mark |
| 37° C., 1 month | 5 marks | 3 marks |
| 37° C., 2 months | 4 marks | 2 marks |

As is apparent from Table 4, regarding the product of the present invention, the change in taste did not become a problem, substantially, even after preservation at 50° C. for 2 weeks (37° C., 2 months). To the contrary, regarding the control 1, the taste has already changed after preservation at 37° C. for one month. After preservation at 50° C. for 2 weeks, an clear change in taste was admitted and an initial pleasant flavor was disappeared organoleptically. Therefore, a main flavor was replaced by a burnt smell by which the browning is accompanied, which results in flavor which is far different from that of a normal soft drink.

Further, regarding the control preparation containing no shell-calcined calcium and control 2, a clear change in taste could be observed, similar to the above control product 1.

What is claimed is:

1. A method for stabilizing and preserving a powdered soft drink preparation, comprising adding 0.2 to 0.5% by weight of a calcium oxide and 0.03 to 1.0% by weight of a particulate silicon dioxide to a powdered soft drink preparation containing a carbohydrate and a sour agent as a main component, each amount being based on the total amount of the preparation.

2. A method for stabilizing and preserving a powdered soft drink preparation according to claim 1, wherein the calcium oxide is selected from the group consisting of a chemically synthesized calcium oxide and a shell-calcined calcium derived from a natural product.

3. A method for stabilizing and preserving a powdered soft drink preparation according to claim 1, wherein the particulate silicon dioxide has a three-dimensional amorphous structure.

4. A method for stabilizing and preserving a powdered soft drink preparation according to claim 1, wherein an average particle size of the particulate silicon dioxide is not more than 15 μm.

5. A method for stabilizing and preserving a powdered soft drink preparation according to claim 1, wherein the carbohydrate is selected from the group consisting of monosaccharide and polysaccharide.

6. A method for stabilizing and preserving a powdered soft drink preparation according to claim 1, wherein the carbohydrate is selected from the group consisting of glucose, fructose, sucrose and maltose.

7. A method for stabilizing and preserving a powdered soft drink preparation according to claim 1, wherein the sour agent is an organic acid.

8. A method for stabilizing and preserving a powdered soft drink preparation as claimed in claim 7, wherein the organic acid is selected from the group consisting of citric acid, tartaric acid, fumaric acid, malic acid, lactic acid and ascorbic acid.

9. The method for stabilizing and preserving a powdered soft drink preparation according to claim 1, wherein the amount of calcium oxide added is 0.25% by weight and the amount of particulate silicon dioxide is 0.05% by weight.

10. A powdered soft drink preparation, comprising a carbohydrate and a sour agent as a main component, wherein 0.2 to 0.5% by weight of a calcium oxide and 0.03 to 1.0% by weight of a particulate silicon dioxide are added as a preservation stabilizer.

11. A powdered soft drink preparation according to claim 10, wherein the carbohydrate is added in a proportion of 65 to 95% by weight, based on the total amount of the powder.

12. A stabilized powdered soft drink preparation according to claim 10, wherein the carbohydrate is selected from the group consisting of monosaccharide and polysaccharide.

13. A stabilized powdered soft drink preparation according to claim 10, wherein the carbohydrate is selected from the group consisting of glucose, fructose, sucrose and maltose.

14. A stabilized powdered soft drink preparation according to claim 10, wherein the sour agent is an organic acid.

15. A stabilized powdered soft drink preparation according to claim 14, wherein the organic acid is selected from the group consisting of citric acid, tartaric acid, fumaric acid, malic acid, lactic acid and ascorbic acid.

16. The powdered soft drink preparation according to claim 10, wherein the amount of calcium oxide added is 0.25% by weight and the amount of particulate silicon dioxide added is 0.05% by weight.

* * * * *

UNITED STATES PATENT AND TRADEMARK OFFICE
CERTIFICATE OF CORRECTION

PATENT NO. : 6,251,457 B1
DATED : June 26, 2001
INVENTOR(S) : Akihisa Takaichi, Toshihiko Okamoto, Tetsuo Fukuda It is certified that error appears in the above-identified patent and that said Letters Patent is hereby corrected as shown below:

<u>Title page,</u>
Item [73], Assignee [Oisuka] <u>Otsuka</u> Pharmaceutical Co., Ltd., Tokyo (JP)

Signed and Sealed this

Twelfth Day of February, 2002

Attest:

JAMES E. ROGAN
*Director of the United States Patent and Trademark Office*

*Attesting Officer*